United States Patent [19]

Lehmann

[11] Patent Number: 4,607,616
[45] Date of Patent: Aug. 26, 1986

[54] ROOF CLADDING OR SIMILAR BUILDING ELEMENT ALLOWING HEAT EXCHANGE WITH THE ENVIRONMENT AND USABLE PARTICULARLY AS A SOLAR ENERGY COLLECTOR

[76] Inventor: Klaus Lehmann, Königstrasse 42, Duisburg, Fed. Rep. of Germany

[21] Appl. No.: 548,853
[22] PCT Filed: Jan. 26, 1983
[86] PCT No.: PCT/DE83/00011
§ 371 Date: Oct. 14, 1983
§ 102(e) Date: Oct. 14, 1983
[87] PCT Pub. No.: WO83/02819
PCT Pub. Date: Aug. 18, 1983

[30] Foreign Application Priority Data
Feb. 16, 1982 [ES] Spain .................................. 509 637

[51] Int. Cl.⁴ ............................................... F24J 2/24
[52] U.S. Cl. .................................... 126/445; 126/429; 126/431; 126/450

[58] Field of Search ............... 126/444, 445, 428, 450, 126/440, 429, 431, 452, DIG. 2

[56] References Cited

U.S. PATENT DOCUMENTS

| 4,144,874 | 3/1979 | Zebuhr ........................... 126/450 X |
| 4,198,953 | 4/1980 | Power ................................. 126/440 |
| 4,237,870 | 12/1980 | Wartes ............................... 126/450 |
| 4,263,896 | 4/1981 | Zebuhr ........................... 126/444 X |
| 4,279,244 | 7/1981 | McAlister ....................... 126/440 X |

*Primary Examiner*—Larry Jones
*Attorney, Agent, or Firm*—George E. Kersey

[57] ABSTRACT

Roof cladding which may be used in different ways as a building element to allow heat exchange with the environment. Each element has hollow chambers and is extrudable in a plurality of layers with a transparent upper layer (1). The hollow ends of the elements are connected in two collection channel systems (15,17) which may be operated in series or parallel according to the desired operating mode.

9 Claims, 6 Drawing Figures

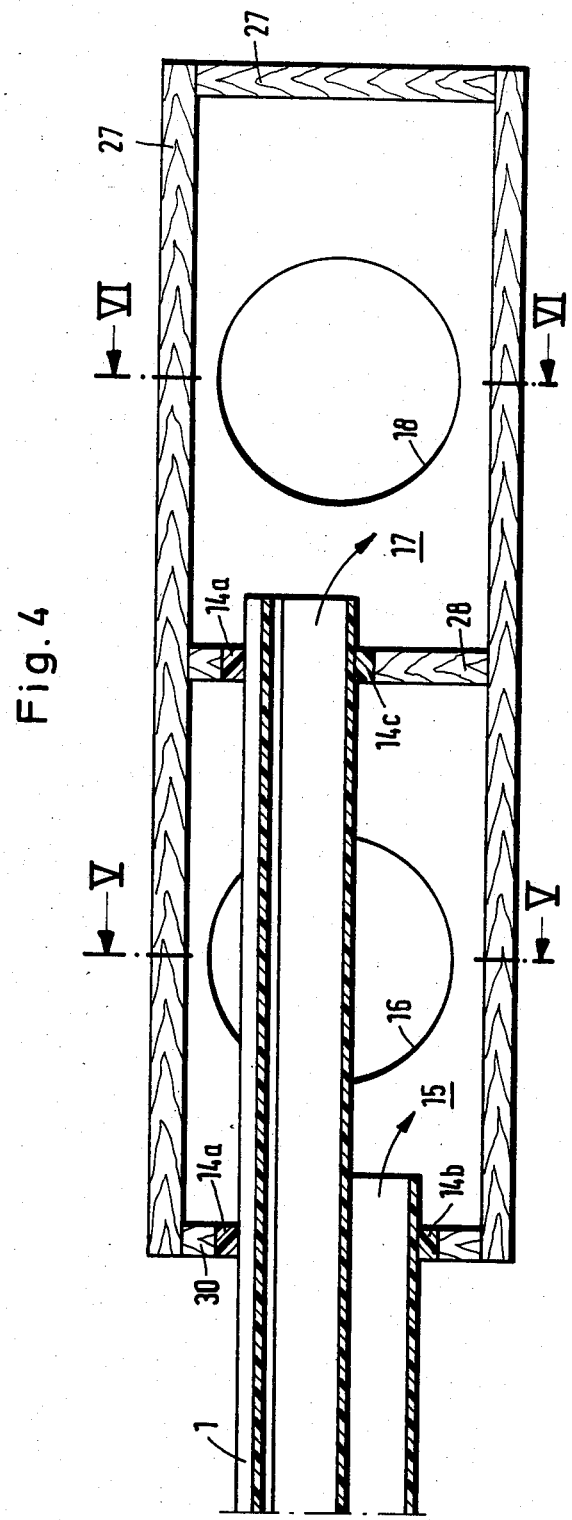

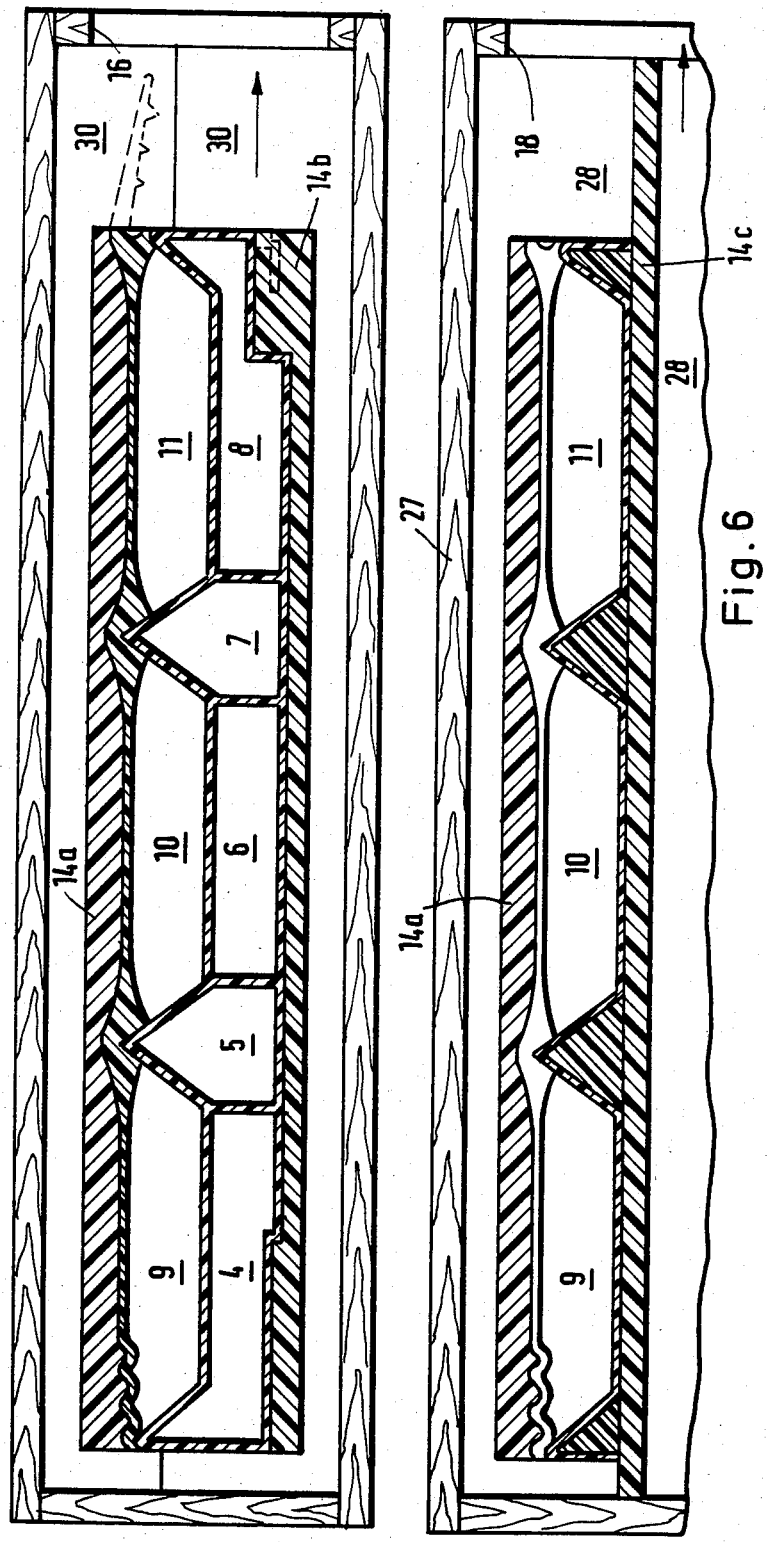

ROOF CLADDING OR SIMILAR BUILDING ELEMENT ALLOWING HEAT EXCHANGE WITH THE ENVIRONMENT AND USABLE PARTICULARLY AS A SOLAR ENERGY COLLECTOR

BACKGROUND OF THE INVENTION

This invention relates to heat exchange constructional elements, and more particularly, to such elements used as solar collecting roof covers.

Solar collectors are widely used as constructional elements. One example is of the type disclosed in German Offenlegungsschrift No. 2,832,304. According to this example, an extrudable, multi-tier element with hollow chambers is provided with a cover that is transparent to light. The open ends of at least one tier of hollow chambers are connected to a collecting channel. High energy losses from heat dissipation to the environment are reduced by providing for circulation of a liquid medium in only the hollow chambers of a lower tier. At the same time the hollow chambers of the overlying tier contain only air and form an effective insulation. This arrangement has the disadvantage that the liquid medium for the heat exchange is heated at a relatively low rate. In addition, only collector operation is possible.

Accordingly, it is an object of the invention to enhance the utility of solar collectors, particularly those which are used as constructional elements. A related object is to enhance the efficiency of solar collection devices.

Another object of the invention is to increase the rapidity with which heat exchange can take place between the flow medium of a solar collector and the environment. A related object is to enhance the degree of heat utilization in a solar collector.

Still another object of the invention is to provide heat exchange constructional elements with multiple modes of operation, allowing not only collector operation but other modes of operation as well.

SUMMARY OF THE INVENTION

In accomplishing the foregoing and related objects, the invention provides a plurality of air collection channels arranged in at least two different systems which are able to communicate with different tiers of hollow chambered constructional elements. The channel systems are switchable into series or parallel circulations depending upon the operating mode that is desired.

In accordance with one aspect of the invention, the flow medium consists entirely of a gas, such as air, as opposed to a liquid. As a result the sealing problems commonly encountered with liquid heating systems are eliminated. It is well known that the sealing of liquid systems makes them expensive and troublesome. In addition, the use of a gaseous flow medium reduces manufacturing expense because double line layouts are not required and expensive absorber surface elements can be omitted.

In accordance with another aspect of the invention, air as a medium of circulation offers the advantage of rapid heating. In comparison with water, for example, the heating of one cubic meter of air by one degree Centigrade requires only one-quarter kilocalorie, as compared with 1,000 kilocalories to heat a comparable amount of water by the same temperature increment. In addition when water is the heat carrier medium, there is a substantial retention time in collectors and absorbers until the desired temperature for heat exchange has been attained. In the case of air, on the other hand, the radiation losses that occur during the long retention time for water are eliminated. Moreover, in the case of air, there is the advantageous possibility of eliminating the discontinuous mode operation that occurs with fluid systems.

In accordance with a further aspect of the invention, at least two channel systems are provided for establishing connection to heat exchangers. Each of the channel systems includes collecting channels that are connected to different tiers of hollow chambers. In a preferred embodiment of the invention with two tiers, two collection channels are required which are connected to the open ends of the hollow chambers of each tier. The mode of functioning of each tier depends upon its operation.

In accordance with yet another aspect of the invention, a double tier of hollow chambers has the following operating modes:

(a) The constructional elements constitute a solar collector when the two channels are separated. An upper tier of hollow chambers which are sealed through a transparent cover are completely closed to form static air cushions in the hollow chambers. This provides an effect comparable to that achieved when forced throughflow is omitted. The second channel is connected to a lower tier which is sealed at the top with an absorber surface. The hollow chambers of the lower tier have forced circulation to allow the air medium to traverse a heat exchange loop.

(b) In one varient of solar collection operation, the two tiers can have a medium flowing through them in parallel. This operating mode is of interest when a high throughput of air with low temperature difference is desired. This mode is particularly suitable for the regulation of temperature differences when the outside temperature is particularly high.

(c) Another operating mode is for cooling, for example of residences in hot climatic zones. For this operation the two plate tiers are connected together, so that the air medium flows through them in series. Air is conveyed in a loop between the hollow chambers of the upper tier and the lower by a blower. Under certain conditions, for example at night with a clear sky, energy is radiated to the environment. The cooling increases with every flow-through of circulation. To achieve the cooling, a certain portion of the cooled air is withdrawn from circulation and a corresponding portion of warm air is introduced into the system. The cooled air can be used, for example, to operate a cold storage unit, and cooling energy can be withdrawn as desired, for example for the cooling of rooms.

(d) Finally, the double tier of hollow chambers can also operate in a pure absorber mode. Heat energy is obtained from the environment, for example from rain, moist air, snow or frozen precipitation. The heat energy is that liberated during a phase change from vapor to water, or from water to ice. Air that is circulated through the hollow chambers of the upper tier are heated at the cover layer. The hollow chambers of the lower tier do not have air flowing through them and form a static air cushion.

The heated air from the upper tier is applied, for example, to a heat pump or to an air-water heat exchanger.

A particularly preferred embodiment of the invention provides that the entire hollow chambered member comprises two tiers of hollow chambers with a cover layer, an intermediate layer, and a bottom layer with wall ridges in between. The member is fabricated, with the exception of the cover layer, entirely by co-extrusion. The cover layer and the remaining plate parts are then brought together in an extrusion die, so that a compact structure is produced in the form of a roof covering. It is also possible to produce partial cross sections by extrusion, with the partial cross sections subsequently connected together. A suitable material for the cover layer is a transparent polycarbonate that is temperature stable to about 150° C. Such a material is commercially available under the tradenames Macrolan or Lexan. A suitable material for the remaining parts, especially the absorber surfaces, is likewise a polycarbonate with glass fibers and a die addition which yields the desired black coloration. In choosing suitable materials, special attention is paid to the lowest possible heat expansion as well as good heat conduction.

An especially advantageous utilization of the absorber surfaces, which are formed by the wall ridges of the intermediate layer of the double tiers of hollow chambers, which connect towards the cover layer, is provided by dividing the cover layer into similar longitudinal sections, each having approximately the cross section of a concave lens. The middle thin-wall section of the concave lens is somewhat stressed; however, there is a thickening of the edge areas or the cover layers, relative to the cross section of each longitudinal section. As a result, even if the suns rays come in at a flat angle, a high radiation yield can be attained by suitable light refraction and diffraction.

The high radiation yield is increased even more by the fact that the wall ridges between the intermediate layer and the cover layer are alternatively slanted, so that neighboring ridges always run together at the cover layer. Between these wall ridges, and the next associated wall ridges, further channel-like hollow chambers are formed which extend over both plate tiers. Though the slant position of the wall ridges which connect the cover layer with the intermediate layer, in collaboration with the special cross sectional form of the cover layer, the roof covering makes it unnecessary to match its inclination to the respective position of the sun, and the roof covering is especially independent of solar position.

For collector operation, it is especially advantageous if the intermediate layer and its wall ridges which connect the cover layer have an enlarged surface, for example ribs or nubs on that side that is turned away from the cover layer. Such a design favors heat transfer from the hollow chambers of the upper tier to the hollow chambers of the lower tier.

The roof covering also solves in an especially advantageous manner the problem of sealing against weather influences, especially the penetration of moisture. For this purpose, the invention provides that the cover layer of a construction element have several covering tabs, projecting at a longitudinal edge, with parallel sealing lips at the underside, and has several parallel ribs at the other longitudinal edge at the upper side, with which the sealing lips of the covering tab of an adjoining construction element engage.

A special advantage of the present roof covering as compared to previously known collector and absorber plates lies in the fact that the air which is circulated through the hollow chambers of the lower tier and which is to be heated in collector operation, can be heated rapidly with practically negligible heat losses. The hollow chambers of the lower tier are, in a sense, triply shielded by an intermediate layer, an overlying air cushion, and an outer transparent cover layer. The roof covering thus makes possible a practically interruption-free, i.e. continuous, operation. Even if solar radiation is interrupted, for example by passing clouds, there is no perceptible impairment of air heating. Because of the low energy required to heat the air, the collector works even with only diffused light.

The present structural members can also be set up in the open independently of roof structures. As a roof covering, they are distinguished by appealing shape, high stability, accessibility and resistance to weather influences. Moreover, the roof covering, due to the structure of the multi-tier hollow chambers, has a high insulating value so that the formation of condensate under the roof covering is avoided.

DESCRIPTION OF THE DRAWINGS

Other aspects of the invention will become apparent after considering several illustrative embodiments, taken in conjunction with the drawings in which:

FIG. 4 is a longitudinal sectional view of a hollow chamber member in its end region showing channel connections;

FIG. 5 is a sections along the lines V—V of FIG. 4; and

FIG. 6 is a section along the lines VI—VI of FIG. 4.

DETAILED DESCRIPTION

Figure 1:
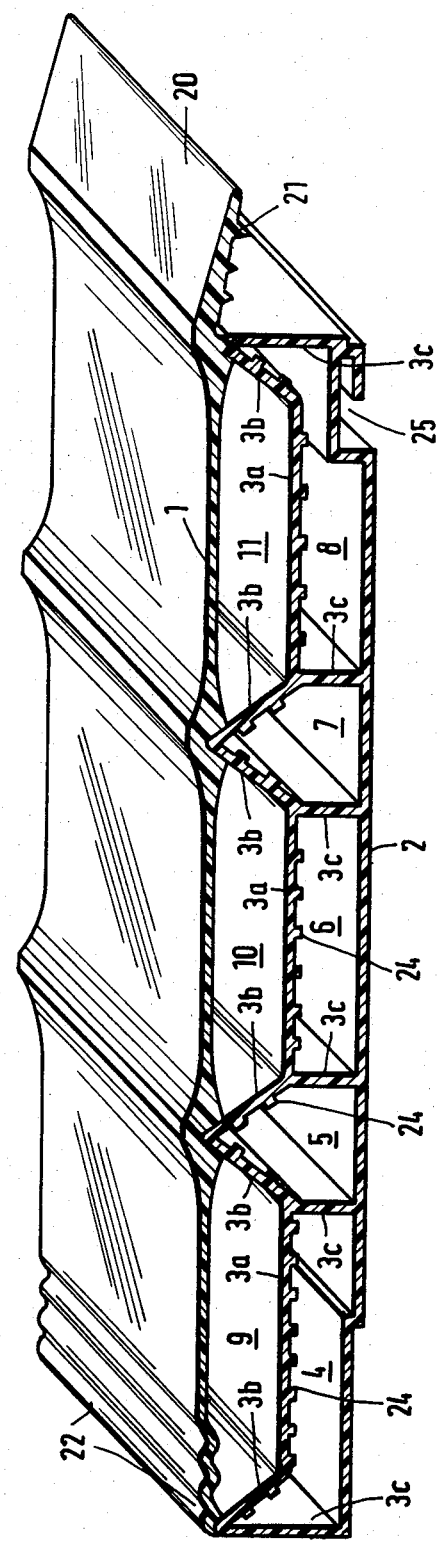
FIG. 1 is a sectional perspective view of a hollow chamber member in accordance with the invention.

With reference to the drawings, FIG. 1 shows a two tier or double hollow chamber element or member consisting of a cover layer 1, a bottom layer 2 and an intermediate layer 3a, as well as wall ridges 3b and 3c interconnecting these layers. The cover layer 1 is made of highly transparent plastic, while the remaining layers and ridges of the hollow chambered element consist of black-dyed plastic. A suitable plastic is polycarbonate, whose composition is chosen so that it is sufficiently temperature-stable, heat-conducting, and impact proof.

The intermediate layer 3a and the wall ridges 3b, which extend to the cover layer 1, form a black absorption surface which converts into heat the solar radiation incident through the transparent cover layer.

Figure 2:
FIG. 2 is a schematic cross sectional view of a cover layer longitudinal section for the member of FIG. 1.

According to FIG. 2, the cross section of each longitudinal section of the cover layer 1 corresponds to a concave lens which is stretched in its middle area, shown with dots and dashes, corresponding to the width of the longitudinal sections. As a result, the solar rays which are incident at different angles are diffracted or refracted, even if the angle of incidence is very small, so that the most uniform possible distribution of rays on the absorption surface is achieved. Through the action of the cover layer as a concave lens, solar rays which are nearly horizontally incident on the cover layer are diffracted to the interior, that is in the direction of the absorption surface, and are not reflected.

When the hollow chambered element operates in a collector mode, the air being heated is suctioned or forced through the hollow chambers 4, 5, 6, 7, and 8 of the lower tier. This air is heated at the back side of the highly heat-conducting intermediate layer 3a and the associated wall ridges 3b.

By contrast with the hollow chambers of the lower tier, the hollow chambers 9, 10, and 11 of the upper tier have no air flowing through them so that in hollow chambers 9, 10, 11 of the upper tier can either be closed at their ends or can terminate in a closed collection channel. In collector operation, the static air cushion in the chambers 9, 10, and 11 of the upper tier thus acts as an insulating layer. To this is added the insulating effect of the cover layer 1, as well as that of the layers or ridges which form the absorption surfaces. The cover layer 1 particularly acts as protection against radiation.

On their back sides, the sections of the intermediate layer 3a and their associated wall ridges 3b have ribs 24 to improve heat transfer. In place of the ribs 24, other forms of a one-sided surface enlargement are also possible, for example through nubs, protuberences, or the like.

Figure 3:
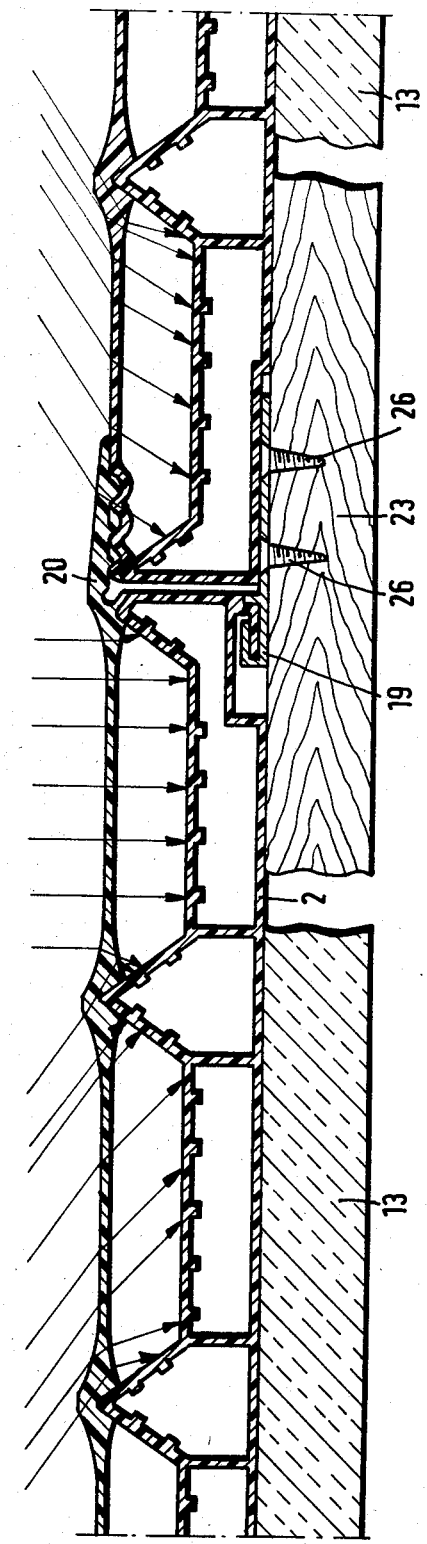
FIG. 3 is a cross sectional view of a mounted hollow chamber member in accordance with the invention.

A groove 25 in the bottom layer 2 is used to suspend the hollow chambered elements in appropriate holding profiles 19, for example by being nailed onto roof battens as shown in FIG. 3. Through these holding profiles, the hollow chambered element is fastened only on one side, so that it can expand unhindered under the influence of heat.

The cover layer 1 of each hollow chambered element has a protruding cover tab 20 at a longitudinal edge. This cover tab 20 has parallel sealing lips 21 at its lower side. The next hollow chambered element is pushed under the cover tab 20 (see FIG. 3), so that the sealing lips 21 engage grooves 22, which are provided along the opposite edge of the cover layer 1 of the element.

In addition, as can be seen in FIG. 3, each hollow chambered element has insulation 13 on its back side. This insulation fills the space between adjoining roof battens 23. Also according to FIG. 3, the holding profile 19 is also shown, fastened through the roof battens by screws 26.

As explained above, in collector operation, the air which is being heated flows through the hollow chambers 4, 5, 6, 7, and 8 of the lower tier. FIG. 4 shows how, for this purpose, the hollow chambers 4 through 8 which conduct the hot air are separated from the hollow chambers 9, 10, and 11 of the upper tier, which act as static air cushions. The heated air is suctioned from the lower tier into a collection channel 15 and applied through an opening 16 to a heat exchanger. The hollow chambers of the upper tier connect with an external collection channel 17, but are not suctioned in collection operation. Alternatively, a closing stopper at the ends of the hollow chambers 9, 10, and 11 of the upper tier may be used (not shown).

In another mode of operation, when the roof covering is used as absorber, to withdraw energy from the environment, the hollow chambers 9, 10 and 11 of the upper tier have forced air flowing through them. The air is heated at the under side of the cover layer 1, through which heat is conducted from outside to inside. The heated air which is suctioned through the hollow chambers of the upper tier is collected in the outer collection channel 17, and applied through its opening 18 to a heat pump or an air-water heat exchanger of a latent storage unit, which in turn can be used by a heat pump. In absorber operation a static air cushion exists in the hollow chambers 4, 5, 6, 7, and 8 of the lower tier.

In another operating mode, the roof covering operates as a cooling device for residences and the like. It is know that with clear night sky, black absorber surfaces radiate considerable amounts of energy into the environment. In the cooling operation, the chambers of both tiers are connected together, so that air is brought into circulation through the hollow chambers of both the upper and lower tiers. The air cools when traversing the hollow chambers of the upper tier. A certain portion of the cooled air is withdrawn from circulation and an appropriate amount of warm air is introduced into the air circulation.

The hollow chambered elements can be assembled from either individual components or can be manufactured, compactly by so-called co-extrusion. A partial extrusion of a component is also possible, for example an external box profile and separate parts utilized as absorbers. Both components can then subsequently be pushed together and joined.

The sectional representation according to FIG. 5 shows the penetration of the hollow chambered element through the side wall 30 of a housing 27 for two flow channels 15 and 17. Similarly, FIG. 6 shows the penetration of the upper tier of the hollow chambered element through the separation of wall 28 between the two flow chanels 15 and 17. Sealing parts 14a, 14b and 14c (FIG. 4) are respectively inserted in the region of the penetration openings.

While various apsects of the invention have been set forth by the drawings and specification, it is to be understood that the foregoing detailed description is for illustation only and that various changes in parts as well as the substitution of equivalent constituents for those shown and described may be made without departing from the spirit and scope of the invention as set forth in the appended claims.

What is claimed is:

1. A roof covering heat exchange constructional element in which a first tier of hollow chambers form a cover layer with wall ridges that connect to the lower side of the cover layer and are alternately slanted and converge at the cover layer, a second tier of hollow chambers which are selectively interpersed with selected chambers of the first tier and the junctions of the interpersed chambers form wall ridges which have approximately the cross section of back-to-back concave lenses, characterized as follows:
   between the converging wall ridges and the associated wall ridges of the next tier, further channel-like hollow chambers are formed which extend over both tiers.

2. A roof covering according to claim 1, characterized as follows:
   The intermediate layer (3a) and its wall ridges (3b) which are connected with the cover layer (1) have an enlarged surfact, e.g. ribs (24) or nubs on the side that is turned away from the cover layer (1).

3. A heat exchange element in accordance with claim 2 wherein said layer of said interspersed chamber has a concave inner surface.

4. A roof covering according to claim 1, characterized as follows:
   The cover layer (1) of the construction element has a protruding cover tab (20) with parallel sealing lips

(21) at its lower side on one longitudinal edge; and also has several parallel grooves (22) on the upper side at the other longitudinal edge; with the sealing lips (21) of the covering tap (20) of an adjoining construction element engaging said grooves (22).

5. A roof covering or similar construction element for exchanging heat energy with the environment, especially as a solar collector, where the construction element is extrudable and has multiple tiers of hollow chambers, including an upper tier with converging side walls and upper lens surfaces at a common junction for adjoining chambers, a lower tier formed by successive hollow chambers of substantially rectangular cross section with intervening chambers, each formed by the converging side walls of the upper tier and adjoining side walls of the lower tier; the lower chambers being connected to a common inlet/outlet; and both tiers being used for heating or cooling by the flow of gas through said tiers simultaneously.

6. A roof covering according to claim 5, in which the entire hollow-chambered element comprises at least two tiers which together form a cover layer, an intermediate layer and a bottom layer with wall ridges disposed in between, characterized as follows:

The cover layer (1) is in similar longitudinal sections, each extending between wall ridge (3b) and having approximately the cross-section of a concave lens.

7. A roof covering according to claim 6, characterized as follows:

The cover layer (1) of the construction element has a protruding cover tab (20) with parallel sealing lips (21) at its lower side on one longitudinal edge; and also has several parallel grooves (22) on the upper side at the other longitudinal edge; with the sealing lips (21) of the covering tap (20) of an adjoining construction elements engaging said grooves (22).

8. A roof covering according to claim 5, characterized as follows:

An intermediate layer (3a) and its wall ridges (3b) which are connected with the cover layer (1) have an enlarged surfact, e.g. ribs (24) or nubs on the side that is turned away from the cover layer (1).

9. A roof covering according to claim 5 characterized as follows:

The cover layer (1) of the construction element has a protruding cover tab (20) with parallel sealing lips (21) at its lower side on one longitudinal edge; and also has several parallel grooves (22) on the upper side at the other longitudinal edge; with the sealing lips (21) of the covering tap (20) of an adjoining construction element engaging said grooves (22).

* * * * *